Sept. 24, 1957 W. M. ZAROTSCHENZEFF ET AL 2,807,550
PRE-COOKED FOOD PACKAGE AND METHOD OF PREPARING THE SAME
Filed May 17, 1955
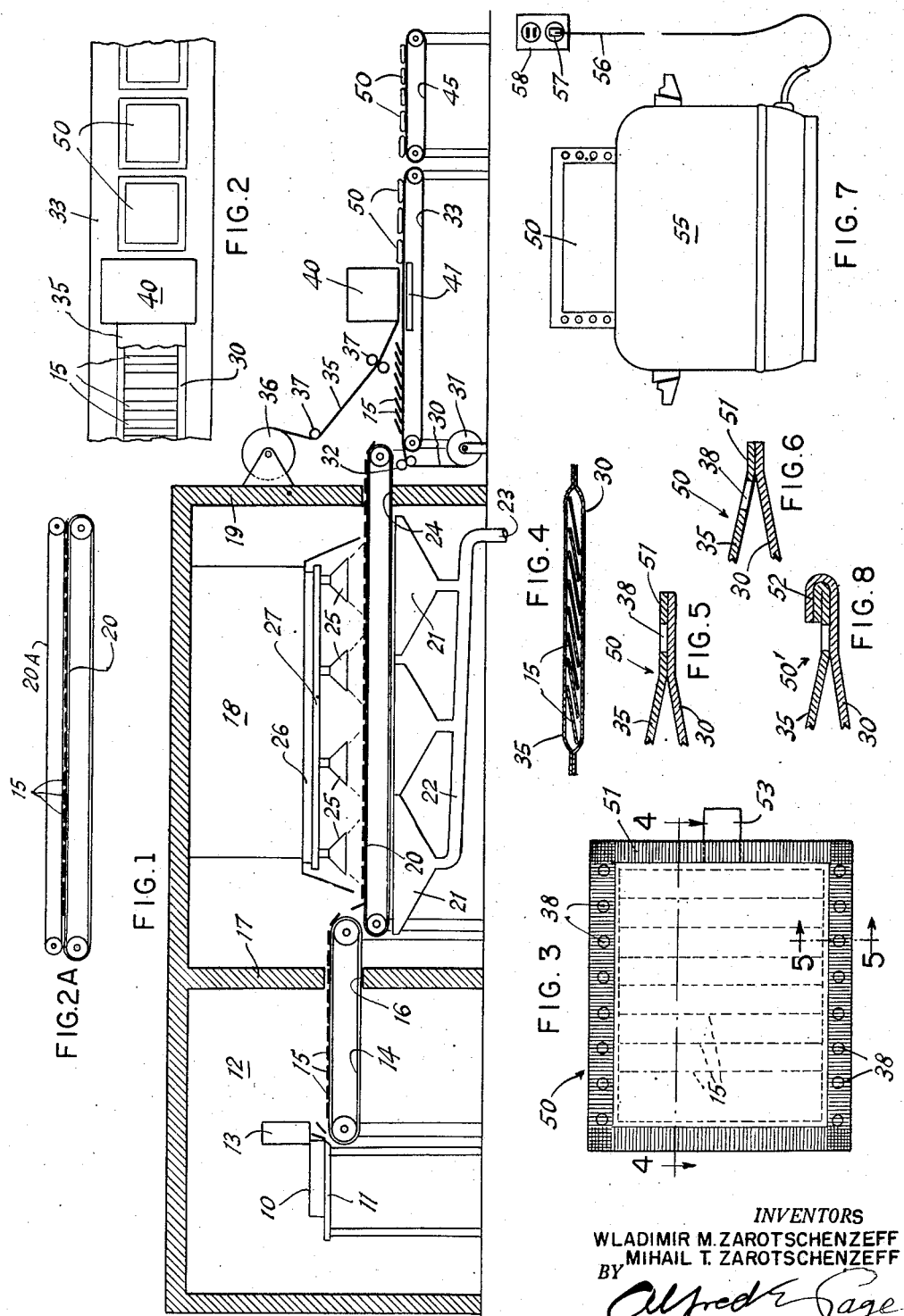
INVENTORS
WLADIMIR M. ZAROTSCHENZEFF
MIHAIL T. ZAROTSCHENZEFF
BY
Alfred Gage
ATTORNEY

United States Patent Office 2,807,550
Patented Sept. 24, 1957

2,807,550

PRE-COOKED FOOD PACKAGE AND METHOD OF PREPARING THE SAME

Wladimir M. Zarotschenzeff, Douglaston, N. Y., and Mihail T. Zarotschenzeff, Los Angeles, Calif.

Application May 17, 1955, Serial No. 508,922

3 Claims. (Cl. 99—174)

This invention relates to pre-cooked food products and, more particularly, to a metal foil encased package containing a serving of pre-cooked meat, such as bacon strips which have been fried or broiled under controlled conditions before packaging, the package being dimensioned to fit readily into an electric toaster for heating of the contents to a serving temperature, and to a method of and apparatus for preparing such package.

The present application is a continuation-in-part of our copending application Serial No. 377,732, filed August 31, 1953, for "Thermal Frozen Food Package" now abandoned.

Fried or broiled bacon is a common breakfast item in most American homes, despite the time and difficulties involved in its proper preparation. It is also a standard breakfast item in commercial eating establishments. However, its popularity as a home prepared food item has suffered substantially from its many shortcomings, such as its high percentage of waste fat, cooking fumes, and spattering of grease, as well as the continued attention necessary to assure a properly prepared serving.

Bacon is most commonly merchandised in the form of flat packages of strips of raw bacon averaging about 16 to 24 strips to the pound, the strips usually being about 9" long and 1½" wide. The strips, which are sliced from a refrigerated bacon "square," thus average less than 1 oz. in weight. About 65% to 70% of the total weight of each strip is drained off, as hot fat or grease, during frying or broiling, so that the useable portion of each strip averages only about ¼ oz. to ⅓ oz. in weight. In many cases, the drained off fat or grease is simply thrown away, although it is highly useful as a cooking fat.

With the modern trend toward quickly prepared meals, the time and care involved in home preparation of bacon has mitigated seriously against its use in the kitchen, so that the total consumption of bacon has not been at its full potential. Such use could be considerably increased by the merchandizing of bacon in such form as to provide uniform economical servings capable of preparation for the table without any significant attention and in a matter of a very few minutes.

To this end, the invention is directed to a novel metal foil encased package of pre-cooked bacon strips having dimensions such that it may be inserted into a slot of an automatic toaster for quick, automatically controlled heating to the desired serving temperature, and to a novel method of preparing such package.

In accordance with the invention, raw bacon strips of substantially one-half the length of these presently merchandized, and preferably somewhat thinner, are pre-broiled under automatically controlled conditions of time and temperature to any desired degree of crispness and fat content, with the extracted fat being collected for re-use. These pre-broiled strips are then sealingly packaged in metal foil, with each package containing the same number of edge overlapped strips, the number of strips equalling a standard serving or "rasher" of broiled bacon. These packages, which are about 4½" by 5" in area and from ¼" to ⅜" in thickness, dependent upon the surface irregularities of the broiled strip, are kept under refrigeration until purchased. The purchaser, when ready to use the bacon, simply inserts the package into an automatic electric toaster and sets the toaster controls, in accordance with instructions on the package or on a pull tab connected to the latter, to heat the bacon to the desired temperature. When the package is ejected by the toaster mechanism, the bacon is ready for serving.

The packaging of half-length strips which are thinner than normal provides for economical use of undersize pieces of bacon, such as bacon butts and ends, which are normally sold at a discount. The thinner strips provide a better appearing bacon serving, giving a maximum area of surface display per unit of weight.

As the prebroiled bacon may contain some moisture, steam may be developed in the package while it is being heated in the toaster. An important feature of the invention is, accordingly, a normally tightly sealed package arranged to vent the package to release steam or hot gases when the package is heated.

For a better understanding of the invention principles, reference is made to the following description of typical embodiments thereof as illustrated in the accompanying drawing.

In the drawing:

Fig. 1 is a schematic longitudinal section of apparatus for preparing the pre-cooked bacon package;

Fig. 2 is a schematic top plan view of a portion of Fig. 1;

Fig. 2A is a similar view of part of Fig. 1 showing means for limiting curling of the bacon during broiling;

Fig. 3 is a plan view of the package as ready for heating in a toaster;

Fig. 4 is a sectional view on the line 4—4 of Fig. 3;

Fig. 5 is a greatly enlarged sectional view on the line 5—5 of Fig. 3, illustrating the edge sealing of the package;

Fig. 6 is a view corresponding to Fig. 5 showing the action of the vent means when the package is heated in a toaster;

Fig. 7 illustrates the package being inserted in an automatic electric toaster; and Fig. 8 is a view similar to Fig. 5 illustrating another form of edge seal for the package.

Referring to Figs. 1 and 2, a slab or equare of bacon 10, preferably at or near freezing temperature, is placed on a table 11 in an insulated refrigerated room 12 and fed to a slicing machine 13. Bacon slab 10 is preferably only half the usual width in order to provide half-length slices. The usual bacon slice is about 9" long and 1½" wide. As it is desired that the ultimate package have a width of 5½", the half length strips are necessary. Furthermore, they are more economical as they can be cut from smaller slabs and even bacon butts and bacon ends. This enables commercial utilization of substandard size bacon slabs, normally sold at a substantial discount.

The full length bacon strips run about 16 to 24 to the pound, and their average weight is thus about 1 ounce. In frying or broiling the strips, about 65% to 70% of the fat is drained off so that the fried or broiled strip weighs about ¼ ounce and has not more than about one-third the initial fat content of the raw bacon. The half-length pre-cooked strips of the invention package will thus average about ⅛ ounce in weight. This fact is of importance as the processing of the bacon strips in accordance with the invention results in a maximum display or surface appearance per unit of weight of the strips.

The slab 10 is prepared in the usual way by properly curing and smoking fresh bacon pieces and pre-forming the same into slabs as by enclosing a bacon piece, as it comes from the smoke house, in a rectangular form and applying pressure to the piece at right angles to the form. While the slab is still in the form, it is customarily thoroughly chilled so that it will retain its shape and can be sliced uniformly.

In accordance with the invention, it has been found that entirely satisfactory bacon strips 15 can be provided by adjusting slicing machine 13 to provide about 32 slices to the pound. The appearance of this thinner strip is the same as that of a heavier strip, but there are more thinner strips in a given unit of weight. While slab 10 may be cut to half the normal width (if it is a full size slab) before slicing, it is within the purview of the invention to cut the slices 15 from a full width slab 10 and then to sever each strip in half.

The bacon slices 15 fall onto an endless conveyor, schematically indicated at 14, which transports the slices through an opening 16 in a heat insulating wall 17 separating refrigerated or chill room 12 from "cooking" room 18. Conveyor 14 is operated at such a speed that the slices 15 fall thereon in separated relation. The slices on conveyor 14 are discharged onto an endless conveyor 20 extending, at its far end, into an opening 24 in an insulating wall 19 at the far end of room 18.

Conveyor 20 carries the raw strips beneath a series of heating lamps 25 mounted from an electric conduit 27 inside a hood 26 of reflective material. Lamps 25 are preferably infra-red lamps, although electrical resistance or gas heating may be used. Conveyor 20 is of stainless steel, and preferably comprises stainless steel wire mesh or interconnected stainless steel plates providing drain openings so that hot fat extracted from slices or strips 15 can flow through the conveyor into troughs 21 draining into a pipe 22 having an outlet 23 for connection to a vat or the like for collection of the hot fat for reclamation or processing. Conveyor 20 may be formed of parallel endless stainless steel wires spaced approximately ¼" apart.

The broiling of strips 15 as they are transported through oven room 18 by conveyor 20 is carried out under carefully controlled conditions to produce broiled strips having the usual and preferred reddish brown or slightly burnt appearance indicative of properly prepared crisp broiled bacon. To produce this appearance of the broiled strips, considerable reliance must be placed on reflective heat waves to scorch the surfaces of the strips, as mere high heating alone will only melt away the fat, leaving flesh tissue which is not desirable from the commercial point of view or for ultimate sales appeal. Such reflective heating is provided by hood 26 whose inner surface is of highly reflective material such as stainless steel.

The desired degree of crispness of the broiled strips is attained by careful control of such factors as the speed of conveyor 20, the distance of lamps 25 from the conveyor, the spacing of the lamps, and the length of the conveyor. The optimum conditions have been determined by numerous tests using 400 watt lamps 25. At a distance of 12" from the upper surface of conveyor 20, the temperature should be from 300° F. to 400° F., with conveyor 20 having a length of 60 feet and travelling this distance in 90 seconds. The speed of the conveyor is carefully controlled in accordance with the heat available, bearing in mind that it takes time for the temperature of the strips 15 to build up to the desired value.

Desired changes in the controlled conditions can be obtained by varying the speed of conveyor 20, and by varying the number or output of lamps 25, as by use of control switches and rheostats. By careful control of these two variables, the strips 15 can be made to have the most appetizing appearance consistent with yield.

It is a common observation that bacon strips have a tendency to curl when being fried or broiled. To limit, if not prevent, such curling, the conveyor arrangement of Fig. 2A may be used in the cooking room. In this arrangement, a second conveyor 20A has a lower run spaced about the thickness of a strip 15 from the upper run of conveyor 20, so that strips 15 are held flat between the two conveyors. Conveyor 20A may comprise parallel endless stainless steel wires spaced approximately ¼" apart. Alternatively, it may comprise a fixed grid of such wires extending longitudinally of conveyor 20.

The broiled strips 15 are discharged from conveyor 20 onto a packing conveyor 33 outside room 18 and operated at normal room temperature. As broiled bacon strips have a small heat capacity, they cool very rapidly at room temperature and can be handled manually within 15 seconds after falling from conveyor 20. However, for sanitary reasons, it is preferred to package the strips with a minimum handling by human beings.

Due to the surface irregularity of broiled bacon strips, which are soft when hot but become brittle when cold, it is important to package the strips while they are still warm. By so doing, the broiled strips can be easily manipulated and, in packaging, yield to applied pressure so as to assume the desired substantially flat shape in the package.

By actual test it has been determined that, when the bacon is sliced, and pre-broiled under controlled conditions of time and temperature, the net weights of the broiled strips are uniform within very close limits. It is possible, therefore, to package eight (8) broiled strips 15 having a substantially uniform weight of ⅔ oz., the strips measuring 4½" by 1½" and being overlapped in the package. This package provides an ample serving of bacon and is also sufficient for two bacon sandwiches on toast.

One way of substantially automatically packaging the broiled strips is illustrated as involving the use of a strip of metal foil 30 fed onto conveyor 33 from a coil 31 by feed rollers 32, the foil 30 travelling in synchronism with conveyor 33. A second or upper strip 35 of metal foil is likewise drawn from a coil or reel 36 and fed in synchronism toward conveyor 33 by feed rolls 37. For a purpose to be described, foil strip 35 has perforations 38 along each edge.

The speed and motion of conveyor 33, and also of foil strips 30, 35, is varied, relative to the speed of conveyor 20, so that the broiled strips 15 fall onto bottom foil strip 30, overlying conveyor 33, in uniformly spaced groups of eight (8) slices, the slices of each group partially overlying each other in the same manner as packaged, sliced raw bacon as merchandised.

As the groups of strips 15 are moved to the right by conveyor 33, they are covered by upper foil 35. The groups of broiled strips 15 encased between upper and lower foils 30, 35 then move between pressing and cutting dies 40—41, die 40 being above strip 35 and lower die 41 being beneath the upper rim of conveyor 33. These dies operate to sealingly press foils 30 and 35 together around the periphery of each group of strips 15, and to sever the strips to form packages 50. For this purpose, dies 40—41 may reciprocate longitudinally of conveyor 33 so as to travel therewith during the sealing and cutting operation.

The packages 50 leaving dies 40—41 comprise two pieces of foil pressed together at their edges to provide sealed edges 51 preferably embossed, crimped, or serrated. The packages have an area of substantially 4½" by 5" and a thickness of from ¼" to ⅜" depending upon the surface irregularities of broiled strips 15.

As strip 35 is firmly pressed against strip 30 and thus pressure sealed thereto around apertures 38, which may be ⅛" in diameter, with these apertures being located in the sealed edges 51, the package 50 is completely sealed, as indicated in Fig. 5. However, when the package is heated, any moisture therein will cause expansion of the package. As a result of such expansion, foil 35 will move away from foil 30 somewhat to "open" an aperture 38 to vent the package, as illustrated in Fig. 6. Such venting is important in that it prevents any air film between the bacon and the foil, thus facilitating quick heating, and avoiding excessive bulging of the package while undergoing heating in a toaster.

If a more secure sealing is required or desired, the overlapped edges of the foils 30, 35 may be folded, as in the package 50' illustrated in Fig. 8, before sealing. This can be effected by suitable known edge folding means operating on the foil strips 30, 35 to form folded edge 52.

The packages 50, illustrated particularly in Figs. 3 and 4, are delivered by conveyor 33 to an inspection and packing conveyor 45 where the packages 50 are inspected, weighed, and packed in cartons.

The packages 50 are so kept under refrigeration, or may be kept frozen, until sold. The ultimate consumer takes the package 50, which has the general dimensions of a slice of bread, and places it in an automatic toaster 55 connected by a cord 56 and plug 57 to an outlet 58. The toaster controls are set, in accordance with instructions on the package, to automatically heat the package for the desired time to the desired temperature. The ejected, heated package may be easily opened by using a pull tab or strip 53 connected in one sealed edge of the package.

The metal foils 30, 35 are preferably aluminum foil of from 0.0010" to 0.0020" in thickness. Aluminum foil 0.0015" thick is preferred as it is inexpensive and comparable in cost to transparent cellulose wrappers commercially used for raw bacon. This foil is inert, non-corrodible, moisture-proof, and light-proof, the latter quality being important in handling fatty products such as bacon. The foil is an excellent heat conductor while, at the same time, being a good insulator due to its reflective properties. Aluminum foil is a better protector of frozen products, exposed to room temperature, than paper or cellulose wrappers, and is totally unaffected by the 350° F. to 450° F. temperatures of an automatic electric toaster. As the foil has a low heat capacity (permitting passage of heat but not retaining heat) it can be manually handled within 5 to 10 seconds after heating.

While a specific embodiment of the invention has been shown and described in detail to illustrate the application of the invention principles, it will be understood that the invention may be embodied otherwise without departing from such principles.

What is claimed is:

1. A heatable sealed package of precooked food comprising a predetermined number of pre-broiled bacon slices having not more than one-third the original fat content of the raw bacon and arranged in parallel relation between two substantially flat walls of metal foil having juxtaposed margins pressed together to seal the package and its contents; said package having lateral dimensions corresponding substantially to those of a slice of bread and being relatively thin for insertion into the bread slice slot of an automatic toaster for automatic heating of the package and its contents by said toaster; one of said substantially flat walls having at least one opening in its said margin sealed by the pressured juxtaposition of said margains, the development of pressure within said package during such heating separating portions of said margins sufficiently to vent the package through such opening.

2. A package as claimed in claim 1 in which said slices are substantially one half the length of standard raw bacon strips as merchandised.

3. A method of preparing a heatable sealed package of pre-cooked food comprising progressively slicing a refrigerated slab of bacon to provide strips of raw bacon; progressively broiling the strips under controlled conditions of time and temperature to extract at least ⅔ the fat content therefrom and provide crisp broiled bacon strips; progressively feeding the broiled strips, in groups each having the same number of strips arranged in parallel partially overlapped relation, between two substantially flat walls of aluminum foil; successively pressing the walls of foil together along marginal areas around each group of broiled strips to form substantially flat edge-sealed food packages; and severing the substantially flat walls around such margined areas to provide individual packages each having lateral dimensions corresponding substantially to those of a slice of bread and being relatively thin for insertion into the bread slice slot of an automatic toaster for automatic heating of the package and its contents by said toaster.

References Cited in the file of this patent

UNITED STATES PATENTS

| | | |
|---|---|---|
| 1,711,372 | Carter | Apr. 30, 1929 |
| 2,465,841 | Bonini | Mar. 29, 1949 |
| 2,609,301 | Lindsey | Sept. 2, 1952 |

OTHER REFERENCES

"Food Engineering," November 1951, page 156.
"Food Manufacture," August 1952, page 306.
"The National Provisioner," Nov. 27, 1954, page 16.